United States Patent [19]

Lewis

[11] 4,002,431
[45] Jan. 11, 1977

[54] NITROUS OXIDE DECOMPOSITION REACTOR

[75] Inventor: George D. Lewis, North Palm Beach, Fla.

[73] Assignee: United Technologies Corporation, Hartford, Conn.

[22] Filed: Dec. 19, 1975

[21] Appl. No.: 642,515

[52] U.S. Cl. .............................. 23/284; 23/277 R
[51] Int. Cl.² ..................... B01J 1/00; B01J 7/00
[58] Field of Search ............. 23/277 R, 281, 284; 239/399, 403, 476; 60/39.46 M

[56] References Cited

UNITED STATES PATENTS

| 2,068,593 | 1/1937 | Bork | 239/476 X |
| 2,140,316 | 12/1938 | Furlong | 23/277 R X |
| 2,656,254 | 10/1953 | Heller | 23/277 R X |
| 2,664,450 | 12/1953 | Sachsse et al. | 23/277 R |
| 2,869,321 | 1/1959 | Welch et al. | 60/39.46 M |
| 2,974,019 | 3/1961 | Sabol | 23/277 R X |
| 2,975,588 | 3/1961 | Smith | 60/39.46 M X |
| 3,079,755 | 3/1963 | Forney | 60/39.46 M X |
| 3,270,038 | 8/1966 | Marshall et al. | 23/284 X |
| 3,483,698 | 12/1969 | Lewis et al. | 60/39.72 P |
| 3,545,947 | 12/1970 | Gray et al. | 23/277 R X |

Primary Examiner—Joseph Scovronek
Assistant Examiner—Arnold Turk
Attorney, Agent, or Firm—Charles A. Warren

[57] ABSTRACT

A reaction chamber in which nitrous oxide is decomposed, with liquid nitrous oxide delivered through an injector system to produce a swirling two-phase flow counter to the flow of the gases produced by decomposition, this counter flow being discharged from the injector system in a direction opposite to the flow of gases through and from the chamber.

6 Claims, 2 Drawing Figures

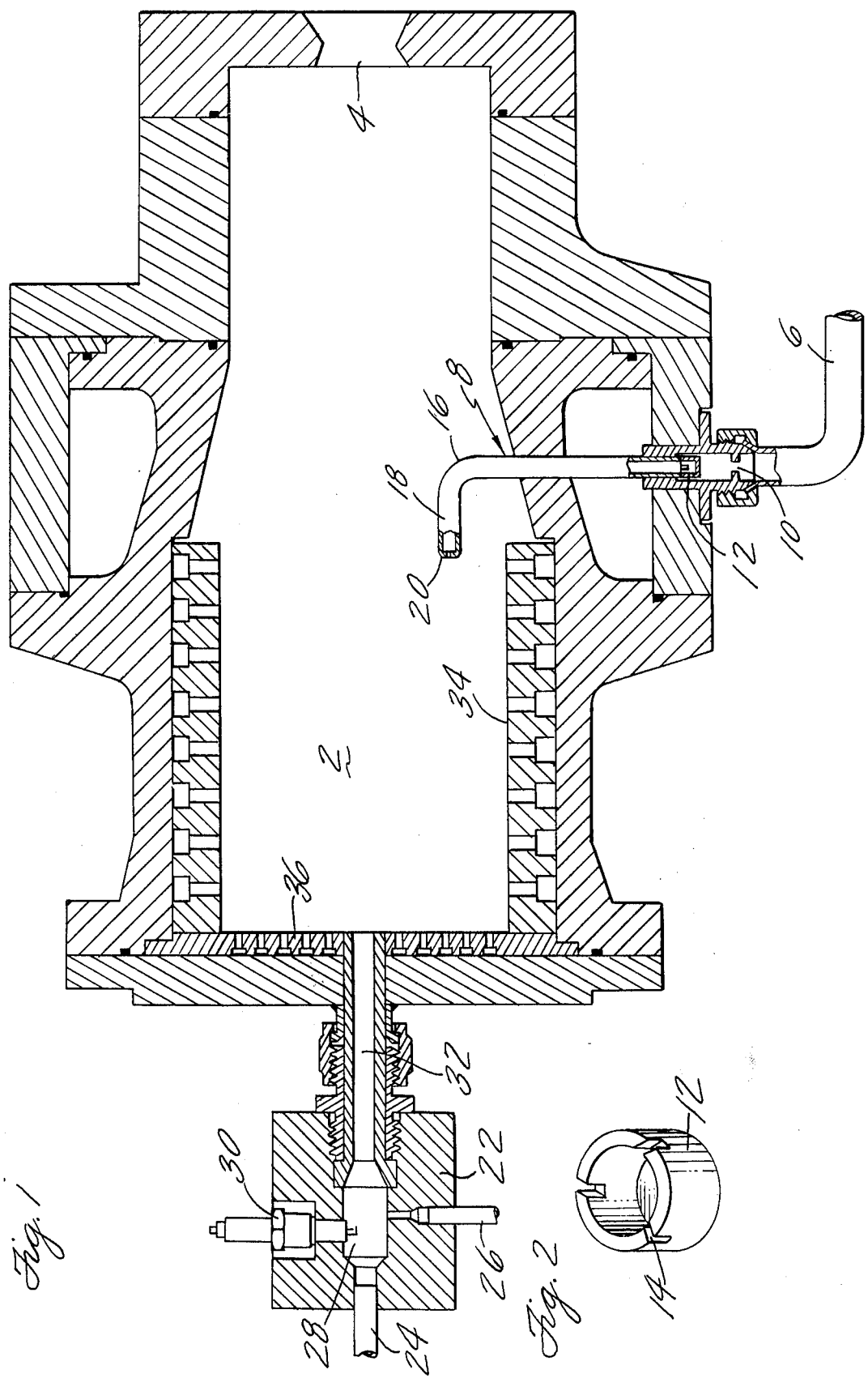

NITROUS OXIDE DECOMPOSITION REACTOR

BACKGROUND OF THE INVENTION

In the decomposition of nitrous oxide it is desirable to start with liquid nitrous oxide for ease of handling and storage. A liquid, rather than a gaseous, nitrous oxide system can present several advantages from a bulk density standpoint. The use of liquid nitrous oxide, however, can present several problems which are related to the fact that nitrous oxide does not readily decompose at low temperatures and pressures, such as those that would be associated with the liquid gas storage.

SUMMARY OF THE INVENTION

Since nitrous oxide as a gas decomposes exothermically, it is desirable to provide for converting this material from a liquid state to a gaseous or at least a two-phase condition before injection into the decomposition chamber and to add enough heat from another source to create the necessary high temperature for decomposition. Thus the principal feature of this invention is a reaction or decomposition chamber having an injector system through which nitrous oxide, entering the system as a liquid is converted at least partially to a gaseous state and is injected into the chamber in a direction opposite to the discharge of gas from the chamber and toward the auxiliary heat source. Another feature is the arrangement for a flow of the gas-liquid mixture within the injector and surrounded by the decomposition products to heat this mixture before discharge from the nozzle. Another feature is an acoustic liner for the chamber to suppress instability in the decomposition reaction.

The foregoing and other objects, features, and advantages of the present invention will become more apparent in the light of the following detailed description of preferred embodiments thereof as illustrated in the accompanying drawing.

BRIEF DESCRIPTION OF THE DRAWING

FIG. 1 is a sectional view through the reactor.
FIG. 2 is a perspective view of the swirler.

DESCRIPTION OF THE PREFERRED EMBODIMENTS

The reaction chamber 2 in which the nitrous oxide is decomposed has an outlet 4 through which the decomposition products are discharged. These products may be used in many ways, for example as the hot gas for thermal mixing lasers. The outlet 4 is smaller than the adjacent portion of the chamber and thus forms a control orifice for the gaseous material discharging therethrough.

The nitrous oxide is delivered as a liquid through a conduit 6 to an injector 8 set in one side wall of the chamber. Within the injector and adjacent the injector inlet is an orifice 10 where the flow rate is controlled and the pressure reduced to below the vapor pressure of the nitrous oxide. Some of the nitrous oxide converts to a vapor at this point, taking its heat of vaporization from the remaining liquid.

This two-phase mixture then passes through a swirler 12, FIG. 2, in the form of a sleeve having tangential slots 14 therein. The two-phase mixture passing inwardly through these slots is caused to swirl as it enters and passes through the injector tube 16. This tube extends radially of the chamber as shown and then is bent in a direction away from the outlet 4 to have a significant section 18 of the tube parallel to the longitudinal axis of the chamber in which its flow is counter to the gas flow in the chamber. The discharge nozzle 20 is at the end of the section 18 of the tube and is remote from the outlet 4.

Centrifugal force resulting from the swirl imparted by the swirler 12 separates the gas from the liquid in the tube and deposits the liquid on the inside wall of the tube 16 where it will be heated from the hot decomposition products surrounding the tube and flowing toward the discharge outlet 4. Nozzle 20 is reduced in area with respect to the tube to increase the swirl velocity of the two-phase mixture and this combined with the acceleration of the mixture as it passes through the nozzle will produce a very fine comminution of the remaining liquid. The mixture of gaseous nitrous oxide and the very fine droplets blend with the hot products of decomposition where they are rapidly heated to the necessary temperature for decomposition.

The decomposition is started and/or maintained by an igniter 22, preferably a hydrogen-oxygen device, having an oxygen inlet 24 and a hydrogen inlet 26, discharging into a mixing chamber 28 wherein ignition is started by an igniter 30. From the chamber 28 the burning mixture is discharged as a torch through the passage 32 into the reactor 2. The heat of this torch heats the nitrous oxide discharging from the nozzle 20 to a temperature at which decomposition takes place. After decomposition begins it is maintained by the heat from the decomposition and the pressure build-up in the reactor. The mixing and very rapid heating of the injected nitrous oxide prevents any significant accumulation of high pressure, intermediate temperature unreacted gas that could explode. The torch igniter provides the necessary energy to initiate the decomposition and to sustain it during the early part of the start transient.

To avoid instability in the decomposition of nitrous oxide it may be desirable to use an acoustic liner 34 for the reactor chamber side wall and another liner 36 at the end thus damping oscillations in both radial and tangential modes as well as longitudinal modes.

In operation, the igniter is started and nitrous oxide is injected. In the particular arrangement shown, the hydrogen-oxygen igniter was supplied by a slight excess of hydrogen for complete combustion. The nitrous oxide was supplied at about 6 pounds per second at a temperature of 520° Rankin and at a pressure of 800 psia. The chamber temperature was about 3100° Rankin and a pressure of 400 psia. The discharge of nitrous oxide from the nozzle is directly into the hottest zone of the hydrogen-oxygen igniter.

The injection swirler induces a swirl and reduces the pressure in a constant enthalpy process across the slots. The two-phase flow in injected into the chamber counter to the chamber flow where a localized decomposition occurs as a result of mixing the gaseous nitrous oxide with the hydrogen-oxygen torch. The reaction then boot straps to steady state. Once self-sustaining decomposition is achieved, the igniter may be turned off. Since nitrous oxide is marginally exothermal, there may be enough heat loss so that the hydrogen-oxygen torch may be maintained in operation at a low level to maintain the desired decomposition temperature.

Although a single nitrous oxide injector is shown in the drawing it may be desirable to have a ring of such injectors arranged symmetrically around the chamber with the nozzles of the several injectors forming a small ring of injectors all spaced about the axis of the chamber and all delivering a two-phase mixture into the chamber in counter relation to the flow of the products of decomposition from the chamber.

Although the invention has been shown and described with respect to a preferred embodiment thereof, it should be understood by those skilled in the art that other various changes and omissions in the form and detail thereof may be made therein without departing from the spirit and the scope of the invention.

Having thus described a typical embodiment of my invention, that which I claim as new and desire to secure by Letters Patent of the United States is:

1. Apparatus for decomposing liquid nitrous oxide including:
    a chamber having a side wall and opposite ends and having a discharge opening at one end;
    an igniter at the other end of the chamber;
    an injector for nitrous oxide in the wall of the chamber, said injector including a tube with one end extending into the chamber, said one end of the tube having a nozzle thereon and being positioned to discharge nitrous oxide toward the igniter, swirl means to impart a swirl to the nitrous oxide entering the tube, and
    an orifice upstream of the swirl means for dropping the pressure below the vapor pressure of the nitrous oxide to convert a part of the liquid to a gas.

2. Apparatus as in claim 1 in which the tube has a portion adjacent the nozzle extending substantially axially of the chamber.

3. Apparatus as in claim 1 in which the orifice and swirler are located near the inlet end of the tube such that a two-phase swirling mixture enters the tube.

4. Apparatus as in claim 1 in which the igniter is a hydrogen-oxygen torch igniter creating a hot zone.

5. Apparatus as in claim 4 in which the portion of the tube adjacent the nozzle is positioned in the chamber such that the flow therein is counter to the flow of the products of decomposition toward the discharge opening.

6. Apparatus as in claim 5 in which the nozzle is positioned to discharge the flow therethrough toward the igniter into the hot zone thereof.

* * * * *